United States Patent
Nakahara (10) Patent No.: US 11,809,756 B2
(45) Date of Patent: Nov. 7, 2023

(54) PRESENT GIVING METHOD, TERMINAL APPARATUS, PRINTING SYSTEM, AND STORAGE MEDIUM FOR SETTING OF HIDING FLAG IN PRINT DESIGN

(71) Applicant: CASIO COMPUTER CO., LTD., Tokyo (JP)

(72) Inventor: Shota Nakahara, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 18/084,871

(22) Filed: Dec. 20, 2022

(65) Prior Publication Data
US 2023/0195390 A1   Jun. 22, 2023

(30) Foreign Application Priority Data
Dec. 21, 2021   (JP) .................. 2021-207051

(51) Int. Cl.
*G06F 3/12*   (2006.01)

(52) U.S. Cl.
CPC .......... *G06F 3/1203* (2013.01); *G06F 3/1256* (2013.01); *G06F 3/1289* (2013.01)

(58) Field of Classification Search
CPC ..... G06F 3/1203; G06F 3/1256; G06F 3/1289
USPC ......................................... 358/1.15
See application file for complete search history.

(56) References Cited

U.S. PATENT DOCUMENTS

| | | | |
|---|---|---|---|
| 2002/0054345 A1* | 5/2002 | Tomida | G06F 3/1289 358/1.15 |
| 2012/0113171 A1* | 5/2012 | Murata | A45D 34/04 396/14 |
| 2021/0067658 A1* | 3/2021 | Xu | B41J 3/4078 |

FOREIGN PATENT DOCUMENTS

| | | |
|---|---|---|
| JP | 2008-197497 A | 8/2008 |
| JP | 2012-135587 A | 7/2012 |
| JP | 2016-527045 A | 9/2016 |

* cited by examiner

*Primary Examiner* — Allen H Nguyen
(74) *Attorney, Agent, or Firm* — Fitch, Even, Tabin & Flannery LLP (57) ABSTRACT

A present giving method performed by a processor includes the following. That is, selecting a print design that is given to a second user who is a receiver of the print design as a present according to operation by a first user who is a giver of the print design; and setting a hiding flag in design information of the print design according to the operation by the first user, wherein when the hiding flag is set, the selected print design is not displayed on a display in a state that the print design is visible when printing is performed on a print target included in the second user.

9 Claims, 8 Drawing Sheets

PRESENT GIVING METHOD, TERMINAL APPARATUS, PRINTING SYSTEM, AND STORAGE MEDIUM FOR SETTING OF HIDING FLAG IN PRINT DESIGN

CROSS-REFERENCE TO RELATED APPLICATIONS

This application is based upon and claims the benefit of priority under 35 USC 119 of Japanese Patent Application No. 2021-207051, filed on Dec. 21, 2021, the entire disclosure of which, including the description, claims, drawings, and abstract, is incorporated herein by reference in its entirety.

TECHNICAL FIELD

The present disclosure relates to a present giving method, a terminal apparatus, a printing system, and a storage medium.

DESCRIPTION OF RELATED ART

In the past, there is a known printing apparatus such as a nail printer that performs printing of a predetermined design on a fingernail. Typically, in such printing apparatus, a finger of a nail that the user desires to perform printing on is placed on a finger stand, and the printing process is performed on the nail using an inkjet format.

JP 2016-527045 describes a certain user allowing other users access to the certain user's storage region of a server so that other users can use the design printed by the certain user.

SUMMARY OF THE INVENTION

A present giving method performed by a processor according to the present disclosure includes, selecting a print design that is given to a second user who is a receiver of the print design as a present according to operation by a first user who is a giver of the print design; and setting a hiding flag in design information of the print design according to the operation by the first user, wherein when the hiding flag is set, the selected print design is not displayed on a display in a state that the print design is visible when printing is performed on a print target included in the second user.

DETAILED DESCRIPTION

Embodiments implementing a present giving method, a terminal apparatus, a printing system and a storage medium including a program according to the present disclosure are described with reference to FIG. 1 to FIG. 8.

Various limitations that are technically preferable to implement the present disclosure are added to the embodiments described below. However, the scope of the present disclosure is not limited to the embodiments and the illustrated examples described below.

According to the embodiments described below, the printing apparatus provided in the printing system is a nail printing apparatus that prints on a fingernail of a hand as a print target. However, the print target of the printing apparatus according to the present disclosure is not limited to the fingernail of a finger. For example, the print target can be a toe nail of a foot, or an object other than a nail such as a surface of a nail tip or various accessories.

Figure 1:
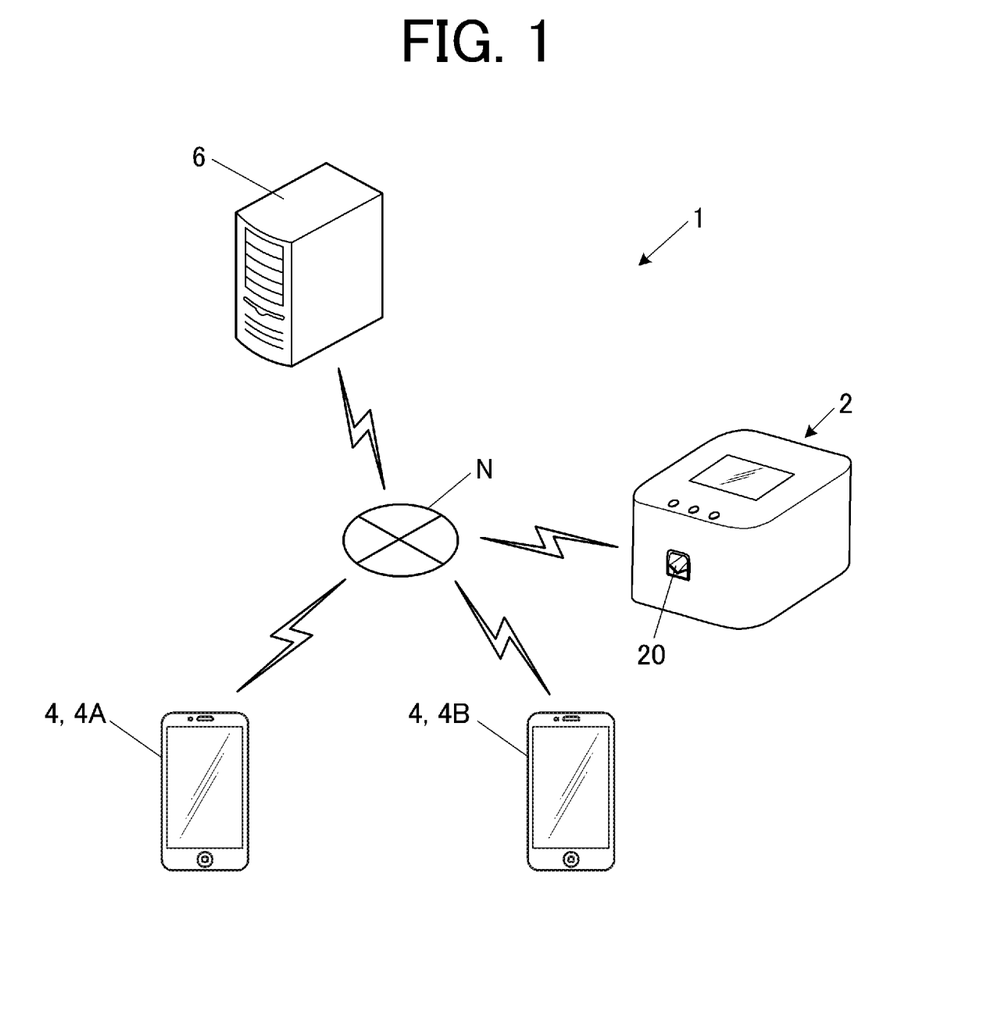
FIG. 1 is a diagram showing a printing system according to the present embodiment.

FIG. 1 is a diagram showing a printing system 1.

As shown in the diagram, the printing system 1 includes a printing apparatus 2, a plurality of (2 apparatuses according to the present embodiment) terminal apparatuses 4 (first terminal apparatus 4A, second terminal apparatus 4B), and a management server (nail server) 6. Such printing apparatus 2, plurality of terminal apparatuses 4, and management server 6 are able to communicate with each other through a network N such as the Internet (or directly).

The printing apparatus 2 is a nail printing apparatus that prints a nail design (print design, hereinafter also simply referred to as "design") on a fingernail of a hand as a print target. An opening is formed on a front surface of the printing apparatus 2, and a finger placer 20 in which a finger (printed finger) including a nail that is the print target is positioned is provided inside the opening. The finger placer 20 supports the finger inserted from the opening from the lower side with resin including flexibility, for example, and positions the finger in the region suitable for printing.

Figure 2A:
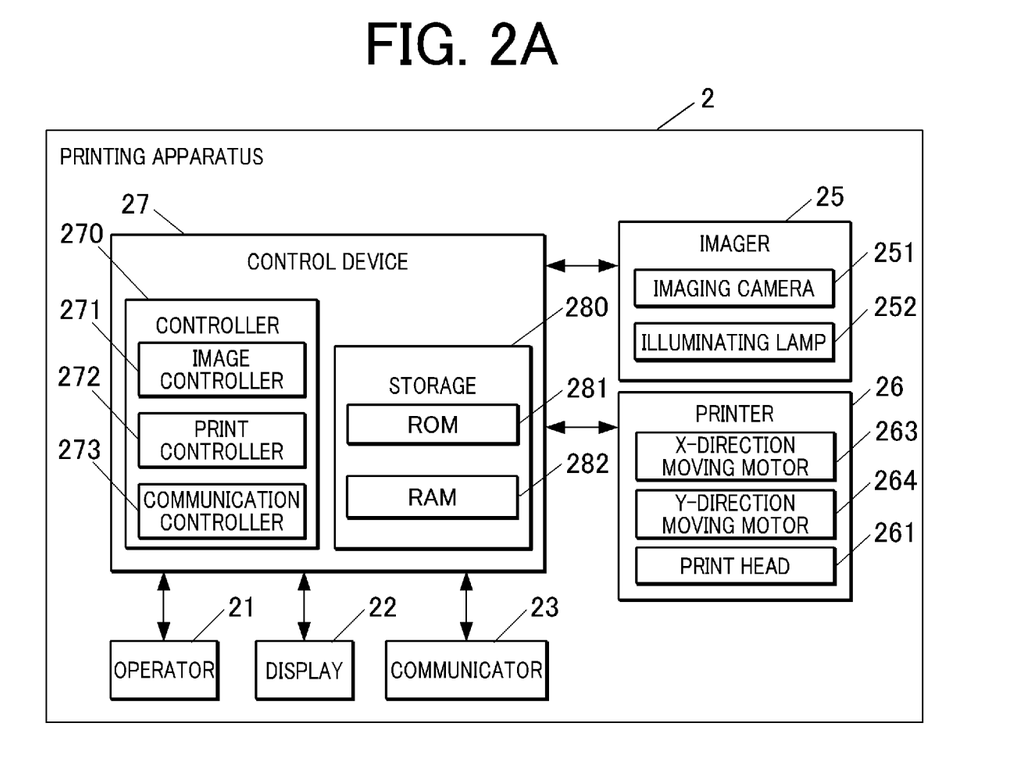
FIG. 2A is a control block diagram showing a schematic control configuration of a printing apparatus.

FIG. 2A is a control block diagram showing a schematic control configuration of the printing apparatus 2.

As shown in this diagram, the printing apparatus 2 includes an operator 21, a display 22, a communicator 23, an imager 25, a printer 26, and a control device 27.

Various input and setting can be performed on the operator 21 according to operation by the user, and an input signal according to the operation received on the operator 21 is transmitted to the control device 27. The operator 21 according to the present embodiment includes an operation button (power switch button) to switch the power of the printing apparatus 2 on and off. The specific configuration of the operator 21 is not limited, and for example, various operation buttons, a keyboard, a pointing device, a touch panel, and the like may be provided as the operator 21.

The display 22 includes a flat display such as an LCD, an organic ELD or the like, and displays various information according to the display instruction from the control device 27. Various indicators may be provided as the display 22.

The printing apparatus 2 may operate according to the operation signal input from an external apparatus such as the terminal apparatus 4, etc., and in this case, the operator 21 and the display 22 do not have to be provided.

The communicator 23 performs wired or wireless data communication through the network N. However, the communication method of the communicator 23 is not limited as long as data communication with the terminal apparatus 4 and the management server 6 is possible. For example, network lines such as the internet can be used or wireless communication using short range wireless communication such as Bluetooth (registered trademark) or Wi-Fi can be used.

The imager 25 is positioned above the finger placer 20 inside the printing apparatus 2. The imager 25 images the surface of the nail exposed upward from the finger placer 20 (finger including nail) and obtains the image (image of finger including nail, hereinafter referred to as nail image).

The imager 25 includes an imaging camera 251 and an illuminating lamp 252.

The imaging camera 251 is a small camera including a CCD (Charge Coupled Device) type or CMOS (Complementary Metal Oxide Semiconductor) type solid state imaging element with 2 million pixels or more, and a lens.

The illuminating lamp 252 is provided adjacent to the imaging camera 251 and is an optical source that illuminates the nail that is the imaged target. The illuminating lamp 252 may be, for example, a white color LED.

The printer 26 is a printer that prints on the nail that is the print target. The printer 26 includes a print head 261 that performs the printing process and an X-direction moving motor 263 and a Y-direction moving motor 264 that move the print head 261.

The print head 261 prints designs on the nail and is able to discharge ink in various colors such as cyan (C), magenta (M), yellow (Y), and the like. Although not limited, the print head 261 is an inkjet head that is able to perform fine printing by spraying fine ink droplets (liquid) from an ink discharge surface onto the nail surface. The type of ink that can be discharged from the print head 261 is not limited to the above, and the print head 261 may be set so that ink in other colors can be discharged. The type of print head and the number of print heads provided as the print head 261 are not limited, and another print head for printing with the ink which is to be the base coat can also be provided side by side.

The X-direction moving motor 263 is driven to move the print head 261 in a left-right direction (X-direction) of the apparatus.

The Y-direction moving motor 264 is driven to move the print head 261 in a front-rear direction (Y-direction) of the apparatus.

The control device 27 is a computer including a controller 270 including a CPU (Central Processing Unit) (not shown) and a storage 280 including a ROM (Read Only Memory) 281 and a RAM (Random Access Memory) 282.

Various programs to operate the printing apparatus 2 and various data are stored in the storage 280.

Specifically, various programs such as a printing process to perform the printing operation, for example are stored in the ROM 281 of the storage 280. Such programs are executed by the control device 27 so as to centrally control each unit included in the printing apparatus 2.

The controller 270 includes functional units such as an image controller 271, a printing controller 272, a communication controller 273, and the like. The functions of each functional unit are executed by the CPU of the controller 270 in coordination with the programs stored in the ROM 281 of the storage 280.

The image controller 271 controls the imaging camera 251 and the illuminating lamp 252 of the imager 25 and controls the imaging camera 251 to image an image (nail image) of a finger including an image of the nail of the printed finger positioned on the finger placer 20. Image data of the obtained nail image is transmitted to the terminal apparatus 4 or the management server 6 through the communicator 23 and the image data is stored. The image data may be stored in the storage 280.

The printing controller 272 outputs a control signal to the printer 26 based on the print data transmitted from the terminal apparatus 4 or the management server 6, and controls the X-direction moving motor 263, the Y-direction moving motor 264, and the print head 261 of the printer 26 in order to perform printing according to the print data.

The communication controller 273 controls the operation of the communicator 23. According to the present embodiment, the communication controller 273 controls the communication with the terminal apparatus 4 and the management server 6 performed by the communicator 23.

Figure 2B:
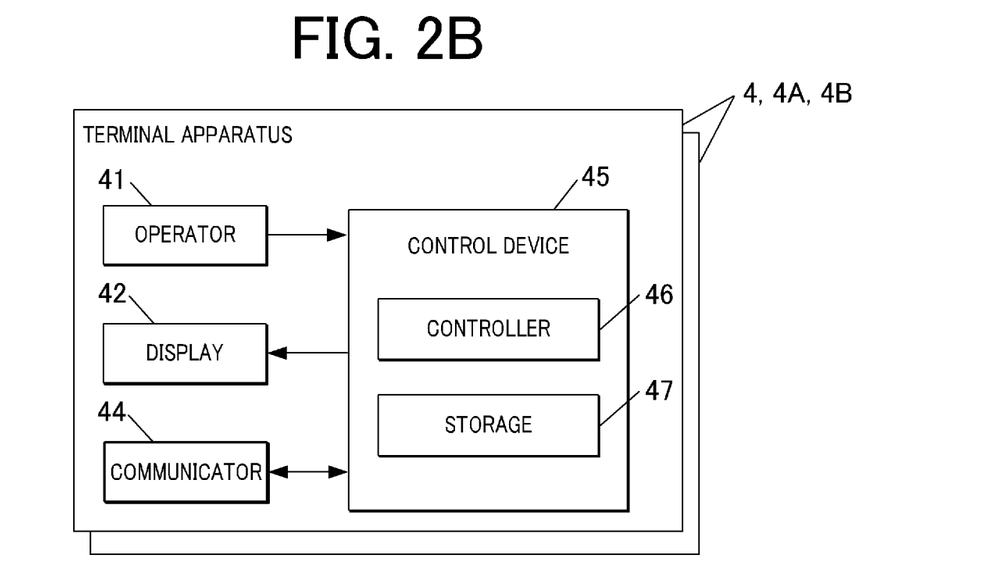
FIG. 2B is a control block diagram showing a schematic control configuration of a printing apparatus.

FIG. 2B is a control block diagram showing a schematic control configuration of a printing apparatus.

As shown in the diagram, each terminal apparatus 4 functions exclusively as a user interface and is a portable terminal such as a smartphone or a tablet. The terminal apparatus 4 according to the present embodiment includes a first terminal 4A operated by a user A and a second terminal 4B operated by a user B. In the description below "A" is added to the end of the reference numeral of the components included in the first terminal 4A, and "B" is added to the end of the reference numeral of the components included in the second terminal 4B in order to discriminate the components.

Each user operates the terminal apparatus 4 and the user is able to register and manage the user information in the management server 6, view and purchase designs and give design data to another user as a present. The terminal apparatus 4 is not limited as long as it is possible to communicate with the printing apparatus 2 and the management server 6, and the terminal apparatus may be a laptop or stationary personal computer, or a terminal apparatus for games.

Specifically, the terminal apparatus 4 includes an operator 41, a display 42, a communicator 44, and a control device 45.

Various input and setting can be performed on the operator 41 according to operation by the user and an input signal according to the operation received on the operator 41 is transmitted to the control device 45. According to the present embodiment, a touch panel as the operator 41 is integrally provided on the surface of the display 42, and the user is able to perform operation such as various input and setting by touching the touch panel. The operator 41 is not limited to a touch panel, and for example, various operation buttons, a keyboard, a pointing device, and the like may be provided as the operator 41.

The display 42 includes a flat display such as an LCD, an organic ELD or the like, and displays various information according to the display instruction from the control device 45.

The communicator 44 performs wired or wireless data communication through the network N. The communication method of the communicator 44 is not limited as long as it is possible to perform data communication with the printing apparatus 2 and the management server 6, and a communication standard that matches with the communication standards of the printing apparatus 2 and the management server 6 is applied.

The control device 45 is a computer including at least one controller (hardware processor) 46 including a CPU (Central Processing Unit) (not shown) and a storage 47 as at least one memory including a ROM (Read Only Memory) and a RAM (Random Access Memory) (both not shown).

The controller 46 centrally controls the operation of each unit in the terminal apparatus 4. The controller 46 executes various functions to operate the terminal apparatus 4 in coordination with the program stored in the storage 47.

Various programs to operate the units in the terminal apparatus 4 and various data are stored in the storage 47. Specifically, in addition to the operation program to centrally control each unit of the terminal apparatus 4, the storage 47 according to the present embodiment stores various programs such as a nail print application program to perform nail printing using the printing apparatus 2. The control device 45 deploys these programs in a work region of the storage 47, for example, and executes the programs. With this, the terminal apparatus 4 is controlled.

Figure 3:
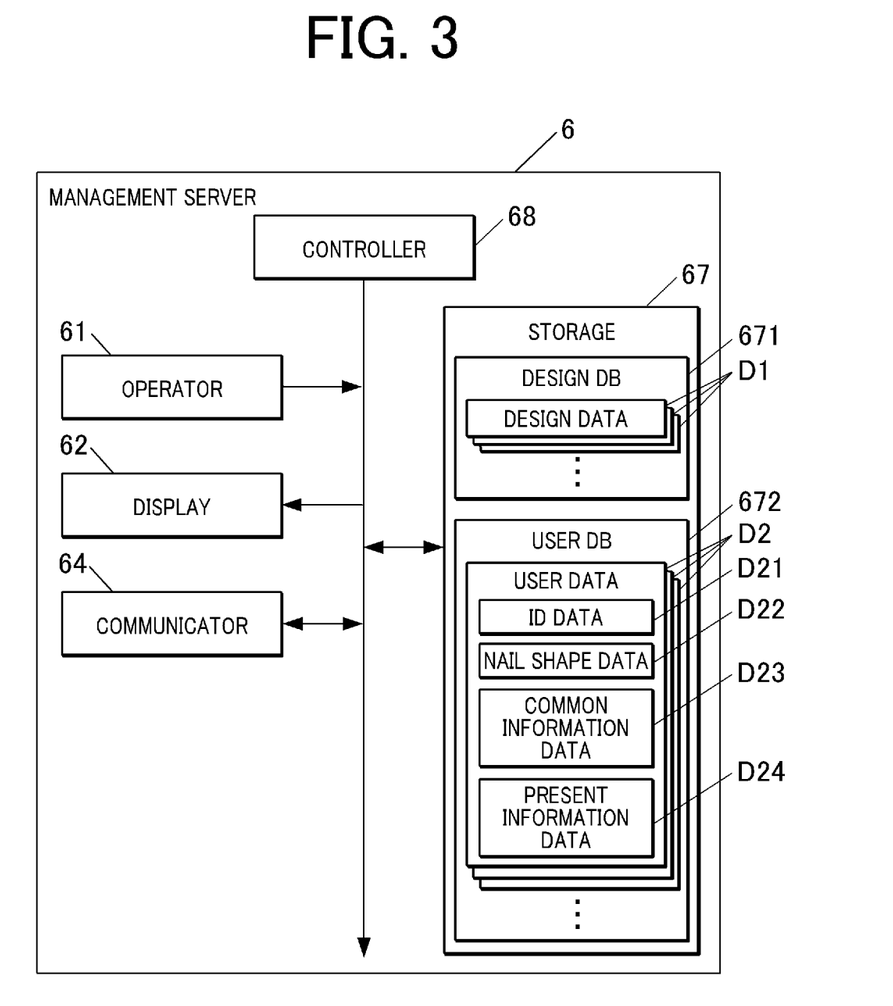
FIG. 3 is a control block diagram showing a schematic control configuration of a management server.

FIG. 3 is a control block diagram showing a schematic control configuration of a management server 6.

As shown in the diagram, the management server 6 is a server to manage the design data and user data.

Specifically, the management server 6 includes, an operator 61, a display 62, a communicator 64, a storage 67, and a controller 68.

Various input and setting can be performed on the operator 61 according to operation by the user and an input signal according to the operation received on the operator 61 is transmitted to the controller 68. The specific configuration of the operator 61 is not limited, and for example, various operation buttons, a keyboard, a pointing device, and the like may be provided as the operator 61.

The display 62 includes a flat display such as an LCD, an organic ELD or the like, and displays various information according to the display instruction from the controller 68.

The communicator 64 performs wired or wireless data communication through the network N. The communication method of the communicator 64 is not limited as long as it is possible to perform data communication with the printing apparatus 2 and the terminal apparatuses 4, and a communication standard that matches with the communication standards of the printing apparatus 2 and the terminal apparatuses 4 is applied.

Various programs to operate the units in the management server 6 and various data are stored in the storage 67. A design database (DB) 671 and a user database (DB) 672 are stored in the storage 67 according to the present embodiment.

A plurality of pieces of design data D1 (design information) which are pieces of information including nail designs are stored in the design DB 671. As described later, a hiding flag can be set in each piece of design data D1 in order to hide the design to the user who receives the design data D1 as a present.

The user data D2 for each user registered in the printing system 1 is stored in the user DB 672. The user data D2 includes ID data D21, nail shape data D22, shared information data D23, and present information data D24.

ID data 21 is ID information to identify the user and includes a user name set when the user registers to a service program (application) provided by the printing system 1.

The nail shape data D22 is information regarding the shape of the user's nail, and includes an image of the outline of the nail and the coordinate data detected from the nail image obtained by the imager 25 of the printing apparatus 2. The nail shape data D22 may be stored automatically in the management server 6 when the nail image is obtained by the printing apparatus 2, or the nail shape data may be stored according to operation by the user.

The shared information data D23 is information regarding other users who the user is sharing the nail shape data D22 with. The shared information data D23 includes ID information of other users that the user is sharing (disclose) his/her nail shape data D22 with and the ID information of other users with the nail shape in the nail shape data D22 that is being shared (disclosed) to the user. The setting of sharing the data is performed by the user specifying other users in order to share his/her nail shape data D22.

The present information data D24 is information regarding a design included in the design data that the user received or gave (or is planning to receive or give) as a present. The present information data D24 is stored including information showing whether the user received or gave the design, ID information of another user who gave or received the design and the data of the design itself associated to each other.

The controller 68 centrally controls the operation of each unit in the management server 6. The controller 68 executes various functions to operate the management server 6 in coordination with the program stored in the storage 67.

Figure 4:
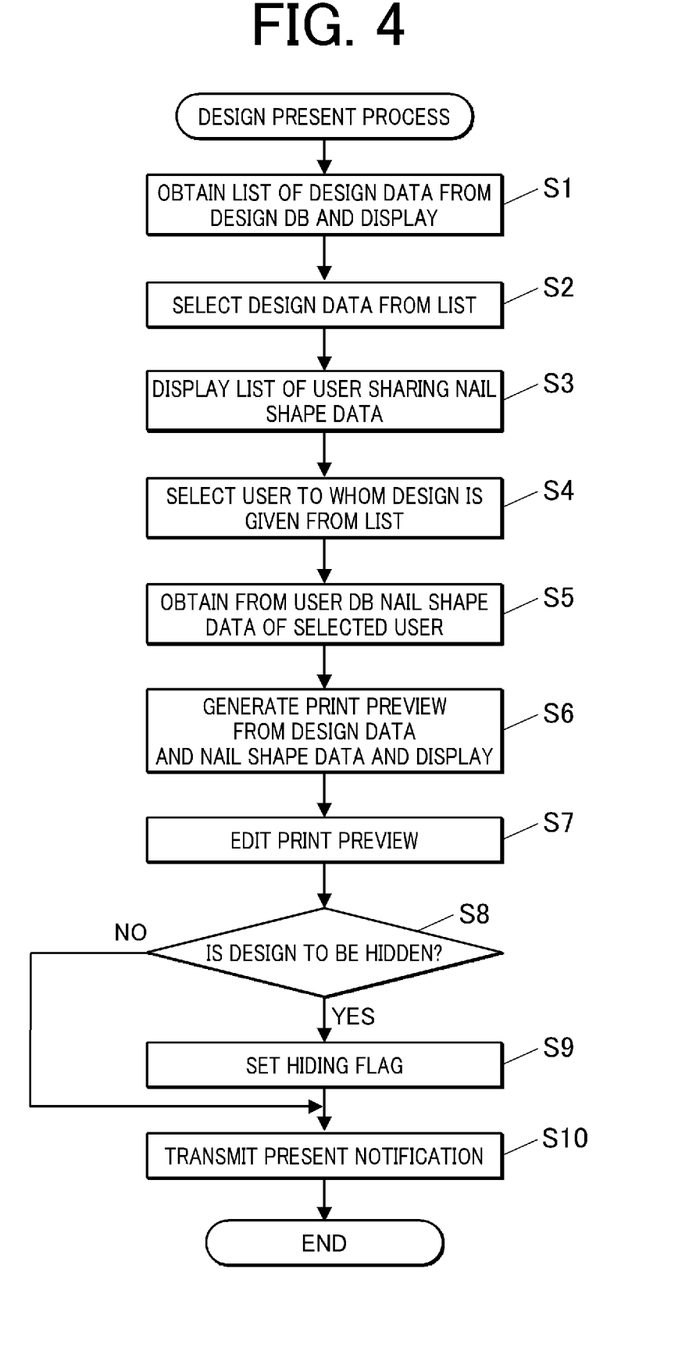
FIG. 4 is a flowchart showing a flow of a design present process according to the present embodiment.
Figure 5A:
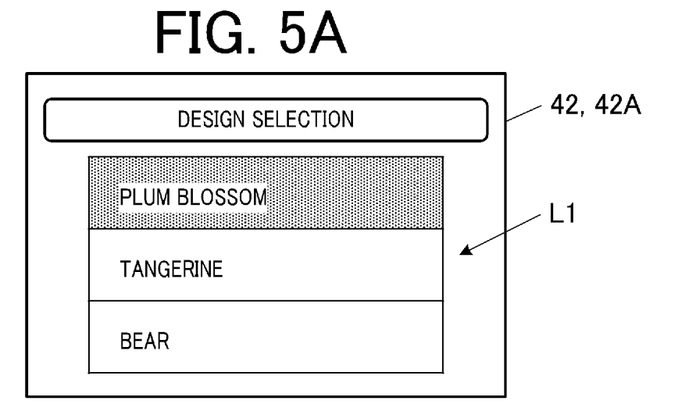
FIG. 5A is a diagram showing an example of display contents on a terminal apparatus in a design present process.
Figure 5B:
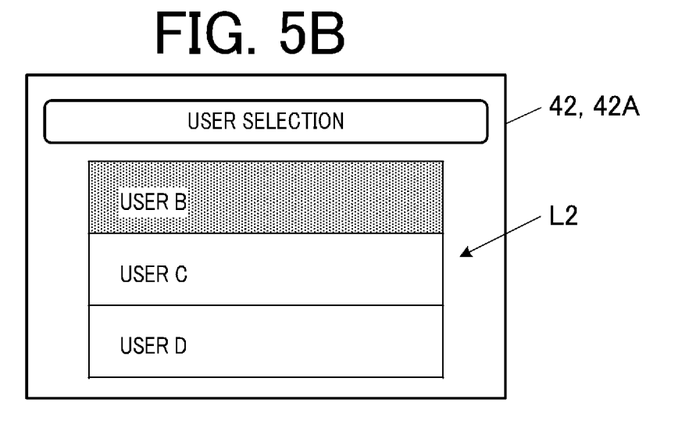
FIG. 5B is a diagram showing an example of display contents on a terminal apparatus in a design present process.
Figure 5C:
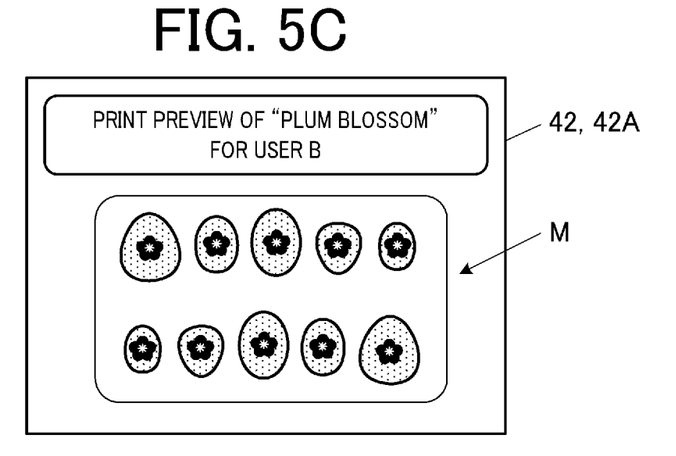
FIG. 5C is a diagram showing an example of display contents on a terminal apparatus in a design present process.

Next, the design present process in which the user gives the design data to another user is described. FIG. 4 is a flowchart showing a flow of the design present process and FIG. 5 is a diagram showing an example of the display contents of the terminal apparatus 4 in the design present process.

The design present process is performed in the terminal apparatus 4 by a controller 46 of the terminal apparatus 4 used by the user deploying a predetermined program stored in the storage 47 based on user operation.

In the example described here, the user A operates the first terminal 4A and gives the predetermined design data D1 to the user B as a present. Both the users A and B perform user registration on a service program provided by the printing system 1, and each user data D2 is registered on the management server 6. The nail shape data D22 of the user B is shared with the user A.

As shown in FIG. 4, when the design present process is performed on the first terminal 4A by user operation (operation of the user A, same as the design present process), the controller 46A of the first terminal 4A obtains a list (design list L1) of the design data D1 from the design DB 61 of the management server 6 and displays the list on the display 42 (step S1; FIG. 5A).

Next, the controller 46A selects the design data D1 given to another user from the design list L1 based on user operation (step S2).

The design data D1 that can be used by the user may include data that needs payment (costs money). In this case, price information is included in the design data D1 and the management server 6 may manage the design data D1 that can be used by the user for free or for a certain price. When the user selects the design data D1 that is not for free, a payment server (not shown) that can communicate with the management server 6 performs a payment process in order to purchase the design data D1.

In addition to the design that is already registered in the design DB 671, the design that the user newly created on the terminal apparatus 4 can be given as a present. In this case, the created design is transmitted to the management server 6 as the new design data D1 and is stored in the design DB 671.

Next, the controller 46A obtains a list of the other users sharing the nail shape data with the user A (user list L2) from the shared information data D23 of the user DB 672 in the management server 6, and displays the list on the display 42 (step S3; FIG. 5B).

Next, the controller 46A selects from the user list L2 another user who is given the design data D1 selected in step S2 as a present based on the user operation (step S4). According to the present embodiment, the user B is selected as another user.

The selection of another user (steps S3 and S4) can be performed before the selection of the design (steps S1 and S2).

Next, the controller 46A obtains the nail shape data D22 of another user (user B) selected in step S4 from the user DB 672 of the management server 6 (step S5).

Then, the controller 46A generates a print preview M showing how the printout of the design data D1 looks when the design D1 is printed based on the design data D1 selected in step S2 and the nail shape data D22 obtained in step S5 and displays the print preview M on the display 42 (step S6, FIG. 5C). The print preview M is generated by fitting the design data D1 to match with the nail shape data D22.

With this, the user A is able to confirm in advance the print preview M showing how the printout looks when the design data D1 given to the user B is printed on the nail of the user B.

Two or all among the design lists L1 shown in FIG. 5A to FIG. 5C, the user list L2 and the print preview M may be displayed together on the display 42. FIG. 5C shows an example of the design printed on ten fingernails of both hands, but the position in the nail and the number of nails that are to be the print target is not limited, and printing may be performed on only specific fingernails.

Next, the controller 46A edits the print preview M displayed on the display 42 according to user operation (step S7). The user A operates the operator 41 as necessary and edits the print preview M. When the editing is performed, the design data D1 is stored as new and separate design data D1 in the design DB 671.

With this, the user A is able to change the color of the design to be given to a color according to the user B's preference, or to change the details of the design.

Next, based on the user operation, the controller 46A determines whether the design of the design data D1 that is given to another user (user B) as a present is hidden when printing is performed (step S8). That is, the user A sets whether to hide the design to the user B when the design is printed.

When it is determined that the design is not to be hidden (step S8; NO), that is, the user A sets that the design is not to be hidden when printing is performed, the controller 46A progresses the process to a later-described step S10.

When it is determined that the design is to be hidden (step S8; YES), that is, the user A sets that the design is to be hidden when printing is performed, the controller 46A sets the hiding flag in the design data D1 (step S9). The hiding flag is a flag so that the design of the design data D is not displayed in a viewable manner on a display unit (display 42 of the terminal apparatus 4 or display 22 of the printing apparatus 2) when the user B performs printing of the design.

Examples of "the design is not displayed in a viewable manner" include not only not displaying the design but also displaying the design in a state that cannot be recognized (for example, displaying the design with a masking process or a mosaic process). Examples of "when the user B performs printing of the design" include that the user B is recognized by the printing apparatus 2 or the terminal apparatus 4 as an operation user of the printing apparatus 2 when a later-described printing process is performed. In this case, the "operation user" includes not only the user directly operating the printing apparatus 2, but also the user operating the printing apparatus 2 indirectly through the terminal apparatus 4.

Next, the controller 46A transmits a present notification to another user (user B) who is given the design (step S10) to show that a design (design data D1) is received as a present (step S10). Such present notification may include information of the design data D1 that is sent (for example, name of design) but this does not include the design (image) itself. The present notification can be directly transmitted between the terminal apparatuses 4 owned by the users A and B or can be indirectly transmitted to the second terminal 4B owned by the user B through the management server 6.

Then, the controller 46A stores the ID information of the user who sent the design associated with the design data in the present information data D24 of the management server 6, and ends the design present process.

Next, the printing process in which the other user who is given the design data performs printing of the design data is described.

Figure 6:
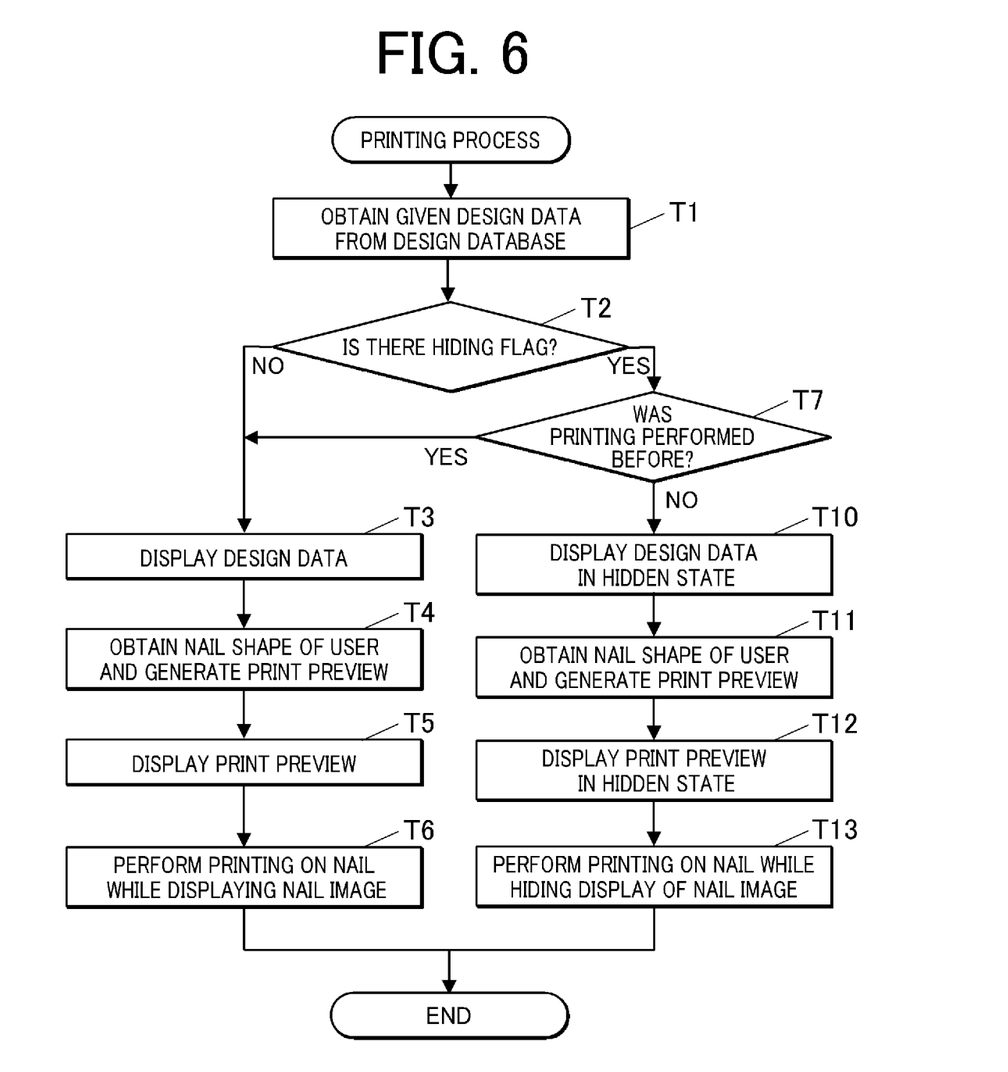
FIG. 6 is a flowchart showing a flow of a printing process according to the present embodiment.
Figure 7A:
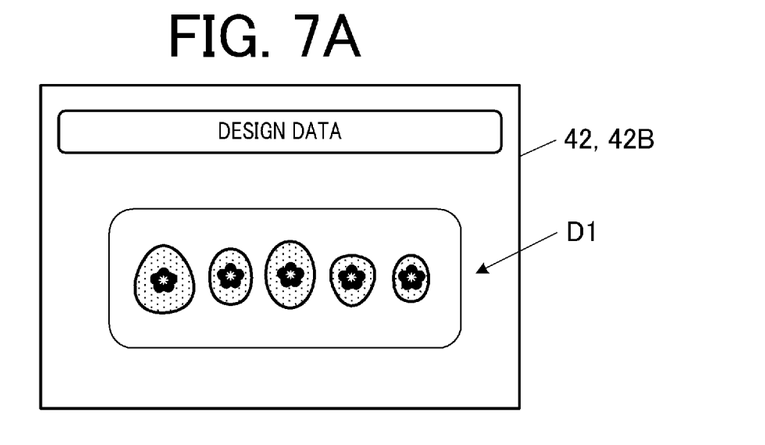
FIG. 7A is a diagram showing an example of display contents on a terminal apparatus or a printing apparatus in a printing process.
Figure 7B:
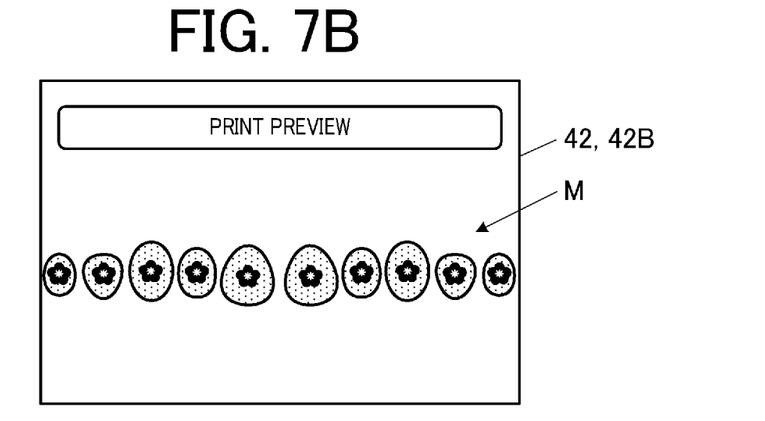
FIG. 7B is a diagram showing an example of display contents on a terminal apparatus or a printing apparatus in a printing process.
Figure 7C:
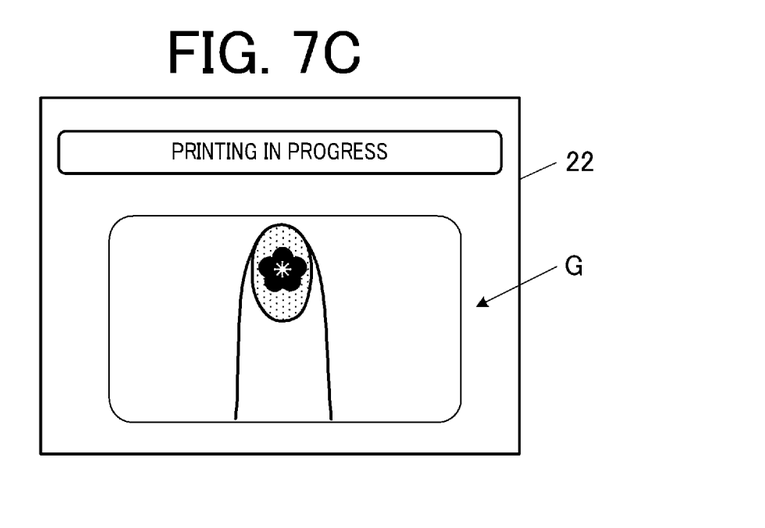
FIG. 7C is a diagram showing an example of display contents on a terminal apparatus or a printing apparatus in a printing process.
Figure 8A:
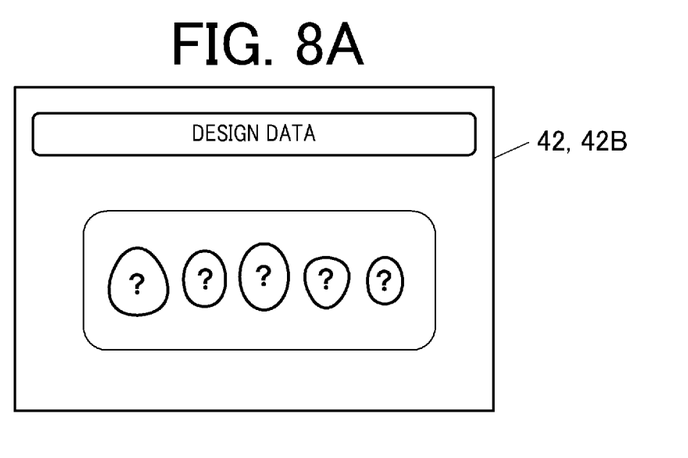
FIG. 8A is a diagram showing an example of display contents on a terminal apparatus or a printing apparatus in a printing process.
Figure 8B:
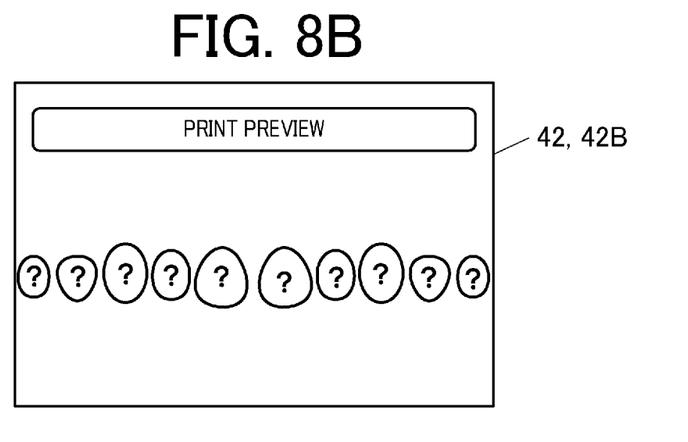
FIG. 8B is a diagram showing an example of display contents on a terminal apparatus or a printing apparatus in a printing process.
Figure 8C:
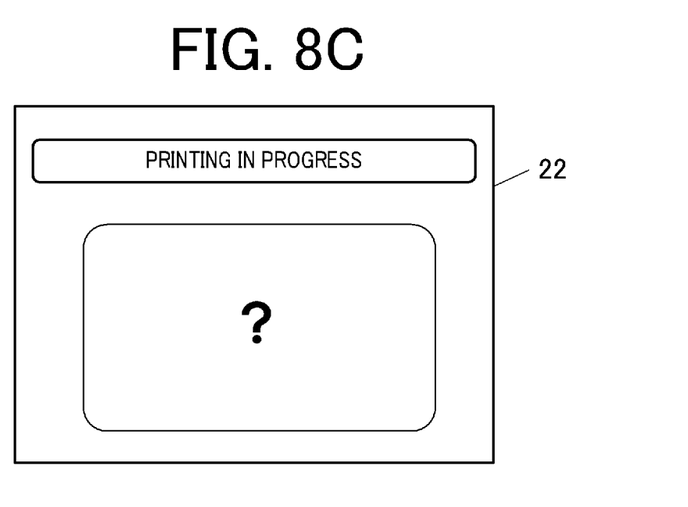
FIG. 8C is a diagram showing an example of display contents on a terminal apparatus or a printing apparatus in a printing process.

FIG. 6 is a flowchart showing a flow of the printing process, and FIG. 7 and FIG. 8 are diagrams showing an example of the contents displayed on the terminal apparatus 4 or the printing apparatus 2 in the printing process.

Such printing process is performed by the terminal apparatus 4 in coordination with the printing apparatus 2 by the controller 46 of the terminal apparatus 4 used by the user deploying the predetermined program stored in the storage 47 according to user operation.

In the description here, the user B who is given the design data D1 from the user A as a present according to the design present process performs printing of the design with the printing apparatus 2 by operating the second terminal 4B. Here, the user B logs in to a service program of the printing system 1 in which accounts are managed and the user B is recognized as the operation user by the terminal apparatus 4 and the printing apparatus 2.

As shown in FIG. 6, when the printing process is performed, the controller 46B of the second terminal 4B obtains the design data D1 given from the user A from the design DB 671 of the management server 6 according to user operation (operation by the user B, same in printing process) (step T1).

Specifically, the user B who received the present notification transmitted in the design present process operates the link attached to the notification, for example, and downloads the design data D2 from the design DB 671.

Next, the controller 46B determines whether the hiding flag is set in the obtained design data D1 (step T2).

Here, when it is determined that the hiding flag is not set (step T2; NO), the controller 46B displays (the image of) the obtained design data D1 on the display 42 of the second terminal 4B (or the display 22 of the printing apparatus 2) (step T3, FIG. 7A).

Next, the controller 46B obtains the nail shape data D22 of the user B, and generates the print preview M in which the given design data D1 is fitted in the nail shape data D22 (step T4). The nail shape data D22 of the user B stored in the management server 6 may be used or the nail shape data D22 may be obtained by imaging the nail with the imager 25 of the printing apparatus 2. The obtained nail shape data D22 of the user B is transmitted to the management server 6 as the user information and stored in the user DB 672.

Next, the controller 46B displays the print preview M generated in step T4 on the display 42 of the second terminal 4B (or the display 22 of the printing apparatus 2) (step T5, FIG. 7B).

Next, the controller 46B performs the printing on the nail with the printing apparatus 2 while displaying the nail image (step T6).

Specifically, first, the controller 46B of the second terminal 4B generates the print data based on the nail shape data D22 and the design data D1 and transmits the print data to the printing apparatus 2. Then, the control device 27 of the printing apparatus 2 controls the printer 26 based on the print data received from the second terminal 4B, and prints the fingernail of the user B positioned on the finger placer 20. During the printing, the nail image G obtained by the imager 25 is displayed on the display 22 of the printing apparatus 2 (or the display 42 of the second terminal 4B) (FIG. 7C).

Then, when the printing of the nail of the user B is complete, the printing process ends.

As described above, when the hiding flag is not set in the design data D1 (or as described later, the printing is not the first time (second time or more) even if the hiding flag is set), the user B is able to confirm the contents of the given design data D1, and the imaged image during printing can be seen.

In the above-described step T2, when it is determined that the hiding flag is set in the design data D1 (step T2; YES), the controller 46B determines whether the user B who is given the present has ever printed the given design data D1 (step T7).

In step T7, when it is determined that the user B printed the given design data D1 before (not the first time) (step T7; YES), the controller 46B progresses the process to the above-described step T3. Then, the processes in steps T3 to T6 are performed and the processes up to printing are performed with the design being displayed.

In step T7, when it is determined that the user B has never printed the given design data D1 (it is printed for the first time) (step T7; NO), the controller 46B displays the (image of) design data D1 on the display 42 of the second terminal 4B (or the display 22 of the printing apparatus 2) in a hidden state (step T10; FIG. 8A). The image of the design data D1 in the "hidden state" is not limited as long as the design cannot be recognized. For example, the design data in which mosaic processing is performed may be displayed. Alternatively, nothing may be displayed.

Next, the controller 46B obtains the nail shape data D22 of the user B and the print preview M is generated (step T11). The step T11 is performed similar to the above-described step T4.

Next, the controller 46B displays the print preview M generated in step T11 on the display 42 of the second terminal 4B (or the display 22 of the printing apparatus 2) in a hidden state (step T12; FIG. 8B). The print preview M in the "hidden state" is not limited as long as the design cannot be recognized. For example, the design data in which mosaic processing is performed may be displayed. Alternatively, nothing may be displayed.

Next, the controller 46B performs the printing on the nail with the printing apparatus 2 while hiding the display of the nail image (step T13).

Specifically, first, the controller 46B of the second terminal 4B generates the print data based on the nail shape data D22 and the design data D1 and transmits the print data to the printing apparatus 2. Then, the control device 27 of the printing apparatus 2 controls the printer 26 based on the print data received from the second terminal 4B, and prints the fingernail of the user B positioned on the finger placer 20. During the printing, the nail image obtained by the imager 25 is displayed on the display 22 of the printing apparatus 2 (or the display 42 of the second terminal 4B) in a hidden state (FIG. 8C). The nail image in the "hidden state" is not limited as long as the design during printing cannot be recognized. For example, the design data in which mosaic processing is performed may be displayed. Alternatively, nothing may be displayed.

Then, when the printing of the nail of the user B is complete, the printing process ends.

As described above, when the hiding flag is set in the given design data D1 and the printing is performed for the first time, the contents of the design data D1 is not displayed during the printing process, and the imaged image during printing is also not displayed. With this, the user B who received the present is not able to confirm the design until the user B actually sees the printed nail. Therefore, it is possible to create a greater sense of surprise.

As described above, according to the present embodiment, the hiding flag is set in the design data D1 of the design given to the user B from the user A according to operation by the user A. When the hiding flag is set, the design is displayed on the display in a state that that the user B cannot view the design while the printing is performed.

With this, the user B who received the present is not able to confirm the design until the user B actually sees the printed nail. Therefore, it is possible to create a greater sense of surprise. Therefore it is possible to provide an entertaining printing system 1.

According to the present embodiment, the print preview M showing how the printout of the design looks when the design is printed is generated based on the nail shape data D22 of the user B and the design given to the user B.

With this, the user A who gives the design can confirm the print preview of the design in advance.

According to the present embodiment, the generated print preview is edited based on the operation by the user A.

With this, the user A is able to add a desired arrangement to the design so as to match the user B's preference.

According to the present embodiment, the nail shape data D22 of the user B obtained by the imager 25 of the printing apparatus 2 is transmitted to the management server 6 as the user data and stored.

With this, the nail shape data D22 of the user B stored in the management server 6 can be disclosed (shared) to other users or may be used in the next opportunity of printing.

According to the present embodiment, the management server 6 discloses the nail shape data D22 of the user B to the user A according to operation by the user B.

With this, the user A can confirm the print preview of the design that matches the nail shape of the user B in advance when the user A gives the design to the user B.

Various embodiments of the present disclosure are described above but the present disclosure is not limited to the above embodiments, and various modifications are possible without leaving the scope of the present disclosure.

For example, according to the present embodiment, the user operates the terminal apparatus 4 when the design is printed, and the printing apparatus 2 is operated, but the user may directly operate the operator 21 of the printing apparatus 2. In this case, various control is performed by the control device 27 of the printing apparatus 2 and the display contents are displayed on the display 22 of the printing apparatus 2.

The hiding flag set in the design data D1 can be lowered once the user who is given the design performs the printing. In this case, the process in step T7 in the printing process (the step to determine whether the printing has been performed before) can be omitted.

According to the design present process, the design is given by selecting another user who is sharing the nail shape data D22 but the design may be given to another user who is not sharing the nail shape data D22.

The nail shape data D22 may be obtained (imaging of the nail) by the camera of the terminal apparatus 4 or the terminal of the nail salon instead of the imager 25 of the printing apparatus 2.

Various data such as the design data D1 and the nail shape data D22 may be stored in the printing apparatus 2 or the terminal apparatus 4 instead of the management server 6. For example, the data of family or friends may be stored in a local region of the storage in the printing apparatus 2 or the terminal apparatus 4, and the print preview with the fitting performed can be confirmed using the nail shape data D22 obtained from the above.

The design in the design data does not have to be the same in all fingers, and the design may be different in each finger. According to the above, for each finger, the user A who gives the design can edit the design assuming the preference of the user and perform the fitting based on the shape of the nail. Therefore, the user B can experience a sense of surprise each time the printing process is performed for each finger.

In order to enhance the effect of surprise, the order of the nail of the finger that is printed can be suitably changed according to operation by the user A. That is, the default order which is to print in order from the nail of the thumb to the nail of the little finger may be changed to print the middle finger last, for example. According to the above, the design that is most surprising can be saved for last and can be printed on the middle finger that stands out more than the little finger.

The timing that the design is disclosed to the user B from the hidden state can be set to be the moment that the printing is completed. That is, a performance can be set so that the image obtained by the imager of the printing apparatus may be displayed on the display the moment that the printing is completed. With this, it becomes more surprising than the user B directly confirming the design printed on the nail.

Although some embodiments of the present disclosure have been described above, the scope of the present disclosure is not limited to the embodiments described above, but includes the scope of the disclosure described in the claims and their equivalents.

The invention claimed is:

1. A present giving method performed by a processor, the method comprising:
    selecting a print design that is given to a second user who is a receiver of the print design as a present according to operation by a first user who is a giver of the print design; and
    setting a hiding flag in design information of the print design according to the operation by the first user, wherein when the hiding flag is set, the selected print design is not displayed on a display in a state that the print design is visible when printing is performed on a print target included in the second user.

2. The present giving method according to claim 1, further comprising,
    obtaining information of a shape of the print target; and
    generating a print preview showing how the print design looks when the print design is printed on the print target based on the information of the shape of the print target and the print design given to the second user.

3. The present giving method according to claim 2 wherein the print preview is edited according to operation by the first user.

4. The present giving method according to claim 1, further comprising,
    selecting the print design given to the second user who is the receiver of the print design as a present with a first terminal that is configured to be able to communicate with a management server that manages print design information and user information and that is operated by the first user; and
    printing the print design given from the first user on the print target using a print head based on print data transmitted to the printing apparatus from a second terminal that is configured to be able to communicate with the management server and the printing apparatus and that is operated by the second user.

5. The present giving method according to claim 4, further comprising obtaining information of a shape of the print target, transmitting the information to the management server as the user information, and storing the information.

6. The present giving method according to claim 5, further comprising the management server disclosing the information of the shape of the print target to the first user according to operation by the second user.

7. A terminal apparatus comprising:
    a memory that stores a program; and
    at least one processor that executes the program stored in the memory, wherein the processor,
        selects a print design that is given to a second user who is a receiver of the print design as a present according to operation by a first user who is a giver of the print design, and
        sets a hiding flag in design information of the print design according to the operation by the first user, wherein when the hiding flag is set, the selected print design is not displayed on the display in a state that the print design is visible when printing is performed on a print target included in the second user.

8. A printing system comprising:
    a terminal apparatus with which a print design given to a second user who is a receiver of the print design is selected according to operation by a first user who is a giver of the print design; and
    a printing apparatus,
    wherein the terminal apparatus is used to set a hiding flag in design information of the print design according to the operation by the first user, wherein when the hiding flag is set, the selected print design is not displayed on the display in a state that the print design is visible when printing is performed by the printing apparatus on a print target included in the second user.

9. A non-transitory computer-readable storage medium having a program stored thereon for controlling a computer included in a terminal apparatus provided with a display, wherein the program controls the computer to perform:

selecting a print design that is given to a second user who is a receiver of the print design as a present according to operation by a first user who is a giver of the print design; and     setting a hiding flag in design information of the print design according to the operation by the first user, wherein when the hiding flag is set, the selected print design is not displayed on the display in a state that the print design is visible when printing is performed on a print target included in the second user.

\* \* \* \* \*